United States Patent
Chen

(10) Patent No.: US 11,784,963 B2
(45) Date of Patent: Oct. 10, 2023

(54) NAT TRAVERSAL METHOD, DEVICE, AND SYSTEM

(71) Applicant: HUAWEI TECHNOLOGIES CO., LTD., Guangdong (CN)

(72) Inventor: Cailong Chen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/698,020

(22) Filed: Mar. 18, 2022

(65) Prior Publication Data
US 2022/0210118 A1 Jun. 30, 2022

Related U.S. Application Data

(63) Continuation of application No. PCT/CN2020/102988, filed on Jul. 20, 2020.

(30) Foreign Application Priority Data

Sep. 19, 2019 (CN) .......................... 201910887618.7

(51) Int. Cl.
*H04L 61/256* (2022.01)
*H04L 45/00* (2022.01)

(52) U.S. Cl.
CPC ............ *H04L 61/256* (2013.01); *H04L 45/20* (2013.01)

(58) Field of Classification Search
None
See application file for complete search history.

(56) References Cited

U.S. PATENT DOCUMENTS

| 8,296,437 | B2 | 10/2012 | Pankratov |
| 9,497,160 | B1 | 11/2016 | Diffie et al. |
| 2007/0157303 | A1 | 7/2007 | Pankratov |
| 2011/0035501 | A1* | 2/2011 | Takeda ............... H04L 43/0811 709/227 |
| 2012/0072548 | A1 | 3/2012 | Kim |
| 2013/0039364 | A1 | 2/2013 | Pankratov |

(Continued)

FOREIGN PATENT DOCUMENTS

| CN | 101217536 A | 7/2008 |
| CN | 101374141 A | 2/2009 |

(Continued)

OTHER PUBLICATIONS

Sebastian Holzapfel et al., SYNI—TCP Hole Punching Based on SYN Injection, 2011 IEEE International Symposium on Network Computing and Applications, Aug. 25, 2011, total 6 pages.

(Continued)

*Primary Examiner* — Kenny S Lin

(57) ABSTRACT

A method, a device, and a system for network address translation traversal are provided. The method is performed by a system in which a first terminal communicates with a second terminal. The first terminal is in a network constructed by a first NAT device, the second terminal is in a network constructed by a second NAT device, and the first NAT device is different from the second NAT device. The method implements NAT traversal through bidirectional dynamic detection of TTL values at both ends of the NAT traversal, to resolve a problem of low NAT traversal efficiency.

16 Claims, 7 Drawing Sheets

(56) References Cited

U.S. PATENT DOCUMENTS

| | | | |
|---|---|---|---|
| 2015/0156167 A1* | 6/2015 | Kuo | H04L 61/2575 709/228 |
| 2015/0271135 A1* | 9/2015 | Tseng | H04L 61/2575 709/228 |
| 2017/0366978 A1* | 12/2017 | Ahmadzadeh | H04L 41/12 |
| 2020/0389429 A1* | 12/2020 | Shribman | H04L 61/2585 |

FOREIGN PATENT DOCUMENTS

| | | | | |
|---|---|---|---|---|
| CN | 101453420 A | | 6/2009 | |
| CN | 106550058 A | | 3/2017 | |
| CN | 107580081 A | | 1/2018 | |
| CN | 109831547 A | | 5/2019 | |
| CN | 110166574 A | | 8/2019 | |
| CN | 113452805 B | | 6/2022 | |
| TW | 201713087 A | * | 4/2017 | H04L 45/20 |

OTHER PUBLICATIONS

Jingtao Lv et al., A TCP-based Asymmetric NAT Traversal Model for P2P Applications, 2012 Second International Conference on Instrumentation and Measurement, Computer, Communication and Control, Decembers, 2012, total 4 pages.

Bryan Ford et al., Peer-to-Peer Communication Across Network Address Translators, 2005 USENIX Annual Technical Conference, Feb. 25, 2019, total 14 pages.

Office Action issued in CN202110689122.6 dated Jan. 19, 2022, 8 pages.

Notice of Allowance issued in CN202110689122.6 dated Apr. 26, 2022, 4 pages.

Extended European Search Report issued in EP20864469.0, dated Jun. 22, 2022, 10 pages.

Office Action issued in IN202217000847, dated Jun. 1, 2022, 5 pages.

International Search Report and Written Opinion issued in PCT/CN2020/102988, dated Oct. 10, 2020, 10 pages.

Office Action issued in CN201910887618.7, dated Mar. 20, 2023, 9 pages.

* cited by examiner

NAT TRAVERSAL METHOD, DEVICE, AND SYSTEM

CROSS-REFERENCE TO RELATED APPLICATIONS

This application is a continuation of International Application No. PCT/CN2020/102988, filed on Jul. 20, 2020, which claims priority to Chinese Patent 201910887618.7, filed on Sep. 19, 2019. The disclosures of the aforementioned applications are hereby incorporated by reference in their entireties.

TECHNICAL FIELD

This application relates to network address translation technologies in the communications field, and in particular, to a method, a device, and a system for NAT traversal.

BACKGROUND

Network address translation (NAT) traversal is a very important technology in the field of peer-to-peer (P2P) real-time audio and videos. The NAT traversal technology may enable clients to directly communicate with each other, thereby reducing a peer-to-peer delay, and reducing pressure and costs of a server.

The NAT technology is a technology for translating an internal network address into an external network address. This technology can not only resolve a problem of insufficient Internet protocol (IP) addresses, but also effectively avoid an attack from outside a network, and hide and protect a terminal inside the network.

A main working process of NAT is modifying a source address and a destination address of a data packet to implement address mapping. In addition, an external network can send data to an internal network terminal only after the internal network terminal actively sends data to the external network. A source address of a data packet sent from an internal network to the external network is modified, and a destination address of a data packet sent from the external network to the internal network is modified. To be specific, external data can reach the internal network terminal through a NAT device only when data is first sent from inside the NAT device. If an internal packet is not sent first, the NAT device discards received external data (where this data is referred to as "unsolicited" data). In addition, currently, many NAT devices have a time sequence requirement. To be specific, when receiving the "unsolicited" data, in addition to discarding the data, the NAT device may blacklist a source IP address and a port from which the "unsolicited" data is sent. Data sent from the address or the port cannot enter the NAT device once the source IP address and the port are blacklisted. Therefore, if the NAT device has the time sequence requirement, NAT traversal cannot be performed, and peer-to-peer communication cannot be implemented.

SUMMARY

Embodiments of this application provide a NAT traversal method, a device, and a system, to resolve a problem of a low traversal success rate of a NAT device having a time sequence requirement.

According to a first aspect, a NAT traversal method is provided, and the method is applied to a system in which a first terminal communicates with a second terminal. The first terminal is a terminal in a network constructed by a first NAT device, the second terminal is a terminal in a network constructed by a second NAT device, and the first NAT device is different from the second NAT device. The method includes: Step 1: The first terminal sets time to live (TTL) to first TTL. Step 2: The first terminal determines whether the first terminal receives, within the set TTL, a first passthrough message sent by the second terminal. When the first terminal does not receive the first passthrough message within the set TTL, the first terminal sends a second passthrough message to the second terminal, and determines whether the first terminal receives a first response message sent by the second terminal. Step 3: If the first terminal receives the first response message sent by the second terminal, the first terminal determines that NAT traversal succeeds, or if the first terminal does not receive the first response message sent by the second terminal, after changing an external network address corresponding to the first terminal and resetting the TTL, the first terminal repeats step 2 until the first terminal receives the first passthrough message or the first response message; and determines that NAT traversal succeeds.

With reference to the first aspect, in some implementations of the first aspect, that the first terminal repeats step 2 after resetting the TTL includes: The first terminal sets the TTL to second TTL, and determines whether the first terminal receives, within the second TTL, the first passthrough message resent by the second terminal, where the second TTL is different from the first TTL. When receiving the first passthrough message within the second TTL, the first terminal determines that the NAT traversal succeeds. When the first terminal does not receive the first passthrough message within the second TTL, the first terminal sends the second passthrough message to the second terminal. If the first terminal does not receive the first response message sent by the second terminal, the first terminal changes the external network address corresponding to the first terminal again and resets the TTL. If the first terminal receives the first response message sent by the second terminal, the first terminal determines that the NAT traversal succeeds.

With reference to the first aspect, in some implementations of the first aspect, the method further includes: When the first terminal receives the second passthrough message sent by the second terminal, the first terminal sends a second response message to the second terminal.

With reference to the first aspect, in some implementations of the first aspect, the first TTL is not greater than a smaller value of a first hop count and a second hop count. The first hop count is a quantity of network segments between the first terminal and the first NAT device, and the second hop count is a quantity of network segments between the second terminal and the second NAT device.

With reference to the first aspect, in some implementations of the first aspect, the first NAT device and the second NAT device are cone NAT devices.

With reference to the first aspect, in some implementations of the first aspect, the first terminal sends first query information to a network device through the first NAT device, where the first query information is used to query the external network address corresponding to the first terminal. The first terminal receives first response information sent by the network device, where the first response information includes the external network address corresponding to the first terminal.

According to a second aspect, a NAT traversal method is provided, and the method is applied to a system in which a first terminal communicates with a second terminal. The first terminal is a terminal in a network constructed by a first NAT device, the second terminal is a terminal in a network constructed by a second NAT device, and the first NAT device is different from the second NAT device. The method includes: Step 1: The second terminal sends a first passthrough message to the first terminal. Step 2: The second terminal determines whether the second terminal receives a second response message sent by the first terminal. If the second terminal does not receive the second response message, the second terminal changes an external network address corresponding to the second device and sets the TTL to first TTL. Step 3: The second terminal determines whether the second terminal receives, within the set TTL, a second passthrough message sent by the first terminal. If the second terminal receives the second passthrough message, the second terminal determines that NAT traversal succeeds, and sends a first response message to the first terminal. Alternatively, the second terminal repeats step 1 and step 2 if the second terminal does not receive the second passthrough message, until the second terminal receives the second passthrough message or the second response message, and determines that NAT traversal succeeds.

With reference to the second aspect, in some implementations of the second aspect, that the second terminal repeats step 1 and step 2 if the second terminal does not receive the second passthrough message includes: When the second terminal does not receive the second passthrough message, the second terminal sends the first passthrough message to the first terminal, and determines whether the second terminal receives the first response message sent by the first terminal. When the first terminal receives the first response message, the second terminal determines that the NAT traversal succeeds. When the first terminal does not receive the first response message, the second terminal changes the external network address corresponding to the second terminal again and sets the TTL to second TTL. The second TTL is different from the first TTL.

With reference to the second aspect, in some implementations of the second aspect, the first TTL is not greater than a smaller value of a first hop count and a second hop count. The first hop count is a quantity of network segments between the first terminal and the first NAT device, and the second hop count is a quantity of network segments between the second terminal and the second NAT device.

With reference to the second aspect, in some implementations of the second aspect, the first NAT device and the second NAT device are cone NAT devices.

With reference to the second aspect, in some implementations of the second aspect, that the second terminal changes an external network address corresponding to the second terminal includes: The second terminal sends second query information to a network device through the second NAT device. The second query information is used to query an external network address corresponding to the first terminal. The second terminal receives second response information sent by the network device. The second response information includes the external network address corresponding to the second terminal.

According to a third aspect, a NAT traversal method is provided, and the method is applied to a system in which a first terminal communicates with a second terminal. The first terminal is a terminal in a network constructed by a first NAT device, the second terminal is a terminal in a network constructed by a second NAT device, and the first NAT device is different from the second NAT device. The method includes: The first NAT device determines whether the first NAT device receives, within first TTL, a first hole punching message sent by the first terminal. If the first NAT device does not receive the first hole punching message, when receiving a first passthrough message sent by the second terminal, the first NAT device blacklists an external network address corresponding to the second terminal. The first NAT device sends a second passthrough message to a changed external network address of the second terminal. When the second passthrough message is not received by the second terminal, the first NAT device resets an external network address corresponding to the first terminal; after the TTL is reset, repeats the process until the first NAT device receives the first hole punching message or the first terminal receives the first passthrough message; and that NAT traversal succeeds.

With reference to the third aspect, in some implementations of the third aspect, repeating the process after the TTL is reset includes: The first NAT device determines whether the first NAT device receives, within second TTL, the first hole punching message sent by the first terminal, where the second TTL is greater than the first TTL. If the first NAT device does not receive the first hole punching message, when receiving the first passthrough message sent by the second terminal, the first NAT device blacklists the changed external network address corresponding to the second terminal, and repeats the process again after the value of the TTL is reset again.

With reference to the third aspect, in some implementations of the third aspect, the method further includes: when the second passthrough message is not received by the second terminal, the first NAT device reallocates an external network address or a port to the first terminal.

With reference to the third aspect, in some implementations of the third aspect, the first TTL is not greater than a smaller value of a first hop count and a second hop count. The first hop count is a quantity of network segments between the first terminal and the first NAT device, and the second hop count is a quantity of network segments between the second terminal and the second NAT device.

With reference to the third aspect, in some implementations of the third aspect, the first NAT device and the second NAT device are cone NAT devices.

With reference to the third aspect, in some implementations of the third aspect, the method further includes: The first NAT device receives first query information sent by the first terminal, where the first query information is used to query the external network address corresponding to the first terminal. The first NAT device sends the first query information to a network device. The first NAT device configures the external network address corresponding to the first terminal, and sends the external network address to the network device. The first NAT device receives first response information sent by the network device, where the first response information includes the external network address corresponding to the first terminal. The first NAT device sends the first response information to the first terminal.

According to a fourth aspect, a NAT traversal method is provided, and the method is applied to a system in which a first terminal communicates with a second terminal. The first terminal is a terminal in a network constructed by a first NAT device, the second terminal is a terminal in a network constructed by a second NAT device, and the first NAT device is different from the second NAT device. The method includes: The second NAT device sends a first passthrough message to the first terminal. If the first passthrough message is not received by the first terminal, the second NAT device resets an external network address corresponding to the second terminal, and determines whether the second NAT device receives, within first TTL, a second hole punching message sent by the second terminal. When the second NAT device does not receive the second hole punching message, if the second NAT device receives a second passthrough message sent by the first terminal, the second NAT device blacklists an external network address corresponding to the first terminal; after the value of the TTL is reset, repeats the process until the first passthrough message is received by the first terminal or the second NAT device receives the second hole punching message; and determines that NAT traversal succeeds.

With reference to the fourth aspect, in some implementations of the fourth aspect, repeating the process after the value of the TTL is reset includes: The second NAT device sends the first passthrough message to the first terminal within second TTL, where the second TTL is greater than the first TTL. If the first passthrough message cannot be received by the first terminal, the second NAT device determines whether the hole punching message sent by the second terminal is received. When the second NAT device does not receive the hole punching message, if the second NAT device receives the second passthrough message sent by the first terminal, the second NAT device blacklists a changed external network address corresponding to the first terminal, and after the value of the TTL is reset again, repeats the process.

With reference to the fourth aspect, in some implementations of the fourth aspect, the first TTL is not greater than a smaller value of a first hop count and a second hop count. The first hop count is a quantity of network segments between the first terminal and the first NAT device, and the second hop count is a quantity of network segments between the second terminal and the second NAT device.

With reference to the fourth aspect, in some implementations of the fourth aspect, the first NAT device and the second NAT device are cone NAT devices.

With reference to the fourth aspect, in some implementations of the fourth aspect, the method further includes: The second NAT device receives second query information sent by the second terminal, where the second query information is used to query the external network address corresponding to the second terminal. The second NAT device sends the second query information to a network device. The second NAT device configures the external network address corresponding to the second terminal, and sends the external network address to the network device. The second NAT device receives second response information sent by the network device, where the second response information includes the external network address corresponding to the second terminal. The second NAT device sends the second response information to the second terminal.

According to a fifth aspect, a terminal device is provided, including: a processing module, configured to: set first TTL, and determine whether a first terminal can receive, within the first TTL, a first passthrough message sent by a second terminal; and a sending module, configured to: when the first terminal does not receive the first passthrough message within the set TTL, send a second passthrough message to the second terminal. The processing module is further configured to determine whether a first response message sent by the second terminal is received. If the first terminal receives the first response message sent by the second terminal, the processing module is further configured to determine that NAT traversal succeeds. If the first terminal does not receive the first response message sent by the second terminal, the processing module is further configured to: after changing an external network address corresponding to the first terminal and resetting the TTL, repeat the process until the first terminal receives the first passthrough message or the first response message, and determine that NAT traversal succeeds.

With reference to the fifth aspect, in some implementations of the fifth aspect, that the processing module repeats the process after resetting the TTL includes: The processing module sets the TTL to second TTL, where the second TTL is different from the first TTL. The processing module determines whether the first passthrough message can be received within the second TTL. When the first terminal does not receive the first passthrough message, the sending module sends a second passthrough message to the second terminal. The processing module determines whether the first response message sent by the second terminal is received. If the first terminal receives the first response message sent by the second terminal, the processing module is further configured to determine that the NAT traversal succeeds. If the first terminal does not receive the first response message sent by the second terminal, the processing module is further configured to: change the external network address corresponding to the first terminal, and reset the TTL.

With reference to the fifth aspect, in some implementations of the fifth aspect, the first TTL is not greater than a smaller value of a first hop count and a second hop count. The first hop count is a quantity of network segments between the first terminal and a first NAT device, and the second hop count is a quantity of network segments between the second terminal and a second NAT device.

With reference to the fifth aspect, in some implementations of the fifth aspect, the first NAT device and the second NAT device are cone NAT devices.

With reference to the fifth aspect, in some implementations of the fifth aspect, the sending module is further configured to send first query information to a network device through the first NAT device, where the first query information is used to query the external network address corresponding to the first terminal. The terminal further includes a receiving module, and the receiving module is configured to receive first response information sent by the network device, and the first response information includes the external network address corresponding to the first terminal.

According to a sixth aspect, a NAT device is provided, and the NAT device is used in a system in which a first terminal communicates with a second terminal. The first terminal is a terminal in a network constructed by a first NAT device, the second terminal is a terminal in a network constructed by a second NAT device, and the first NAT device is different from the second NAT device. The NAT device includes: a sending module, configured to send a first passthrough message to the first terminal within first TTL; and a processing module, configured to: if the first passthrough message cannot be received by the first terminal, determine whether a hole punching message sent by the second terminal is received. The processing module is further configured to: when the second NAT device does not receive the hole punching message, if the second NAT device receives a second passthrough message sent by the first terminal, blacklist an external network address corresponding to the first terminal, and after the value of the TTL is reset, repeat the process until the first terminal receives the first passthrough message or the first NAT device receives the hole punching message.

With reference to the sixth aspect, in some implementations of the sixth aspect, repeating the process after the value of the TTL is reset includes: The sending module sends the first passthrough message to the first terminal within second TTL, where the second TTL is greater than the first TTL. If the first passthrough message cannot be received by the first terminal, the processing module is further configured to determine whether the hole punching message sent by the second terminal is received. When the second NAT device does not receive the hole punching message, if the second NAT device receives the second passthrough message sent by the first terminal, the processing module is further configured to: blacklist a changed external network address corresponding to the first terminal, and after the value of the TTL is reset again, repeat the process.

With reference to the sixth aspect, in some implementations of the sixth aspect, the first TTL is not greater than a smaller value of a first hop count and a second hop count. The first hop count is a quantity of hops between the first terminal and the first NAT device, and the second hop count is a quantity of hops between the second terminal and the second NAT device.

With reference to the sixth aspect, in some implementations of the sixth aspect, the first NAT device and the second NAT device are cone NAT devices.

According to a seventh aspect, a communications device is provided. The communications device includes at least one processor and a communications interface. The communications interface is used by the communications device to exchange information with another communications device. When program instructions are executed in the at least one processor, the communications device is enabled to implement a function of either of the following devices in the method according to any one of the implementations of the first aspect or the second aspect: the first terminal and the second terminal.

According to an eighth aspect, a communications system is provided, including at least one terminal, at least one NAT device, and a server. The terminal is configured to perform the method according to any one of the implementations of the first aspect or the second aspect. The NAT device is configured to perform the method according to any one of the implementations of the third aspect or the fourth aspect.

According to the NAT traversal method provided in the embodiments of this application, TTL of sending messages by a local end and a peer end is detected and the TTL values are dynamically adjusted, to determine that a message sent by one end in peer-to-peer communication can exactly reach a NAT device at the end but does not reach a NAT device at the peer end. In this way, one end generates a mapping table, and an external network address of the end is not blacklisted, so that NAT traversal is finally implemented, and NAT traversal efficiency is improved.

BRIEF DESCRIPTION OF DRAWINGS

FIG. 2(*b*) is a schematic diagram of a working principle of an example symmetric NAT device;

DESCRIPTION OF EMBODIMENTS

The following clearly describes the technical solutions in the embodiments of this application with reference to the accompanying drawings in the embodiments of this application. Clearly, the described embodiments are some but not all of the embodiments of this application. All other embodiments obtained by a person of ordinary skill in the art based on the embodiments of this application without creative efforts shall fall within the protection scope of this application.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal in the embodiments of this application may be user equipment, an access terminal, a subscriber unit, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile communication network (PLMN), or the like. This is not limited in the embodiments of this application.

For ease of understanding, a NAT technology is first described with reference to the accompanying drawings.

Figure 1:
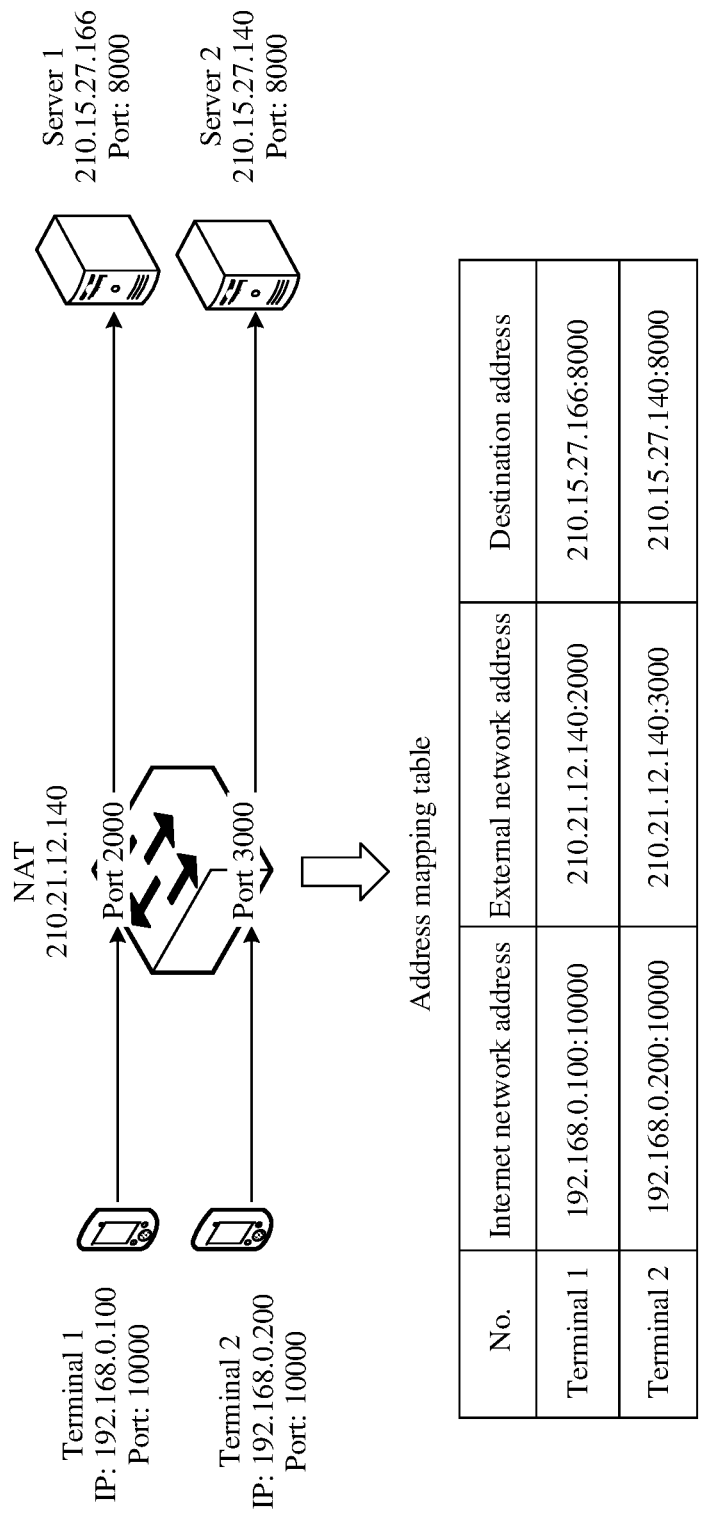
FIG. 1 is a schematic diagram of a working process of an example NAT device.

FIG. 1 is a schematic diagram of a working process of an example NAT device.

As shown in FIG. 1, the NAT device maintains an address mapping table. An internal network address, a mapped external network address, and a destination address of a terminal are recorded in the address mapping table, and the mapping table is initially empty. For example, source addresses and mapped addresses of a terminal 1 and a terminal 2 are recorded in the address mapping table shown in FIG. 1. Addresses of the terminal 1 are used as an example. An internal network address of the terminal 1 is 192.168.0.100:10000, a destination address for peer-to-peer communication is 210.15.27.166:8000, and an external network address obtained after the NAT device maps the internal network address of the terminal 1 is 210.21.12.140:2000. When the terminal 1 communicates with a peer end at the destination address, the mapped external network address needs to be used for communication. A specific communication process is described below.

Figure 2A:
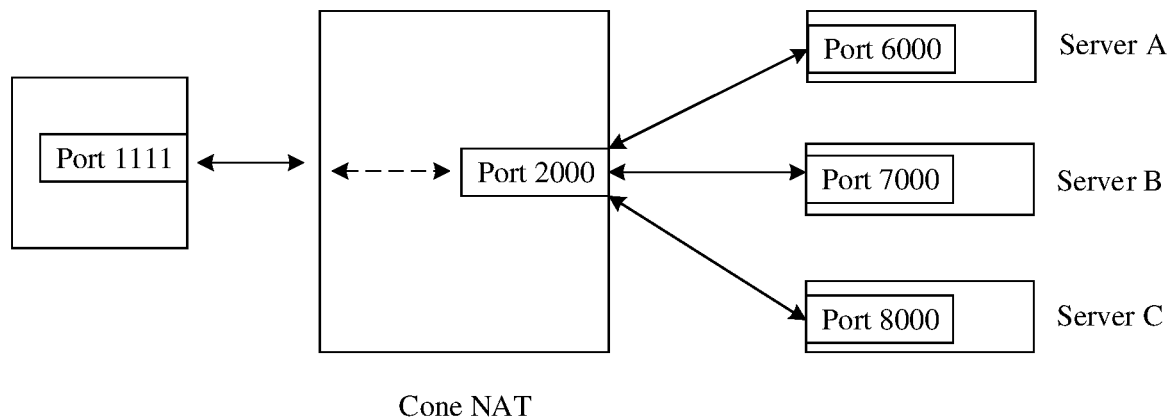
FIG. 2(*a*) is a schematic diagram of a working principle of an example cone NAT device.
Figure 2B:
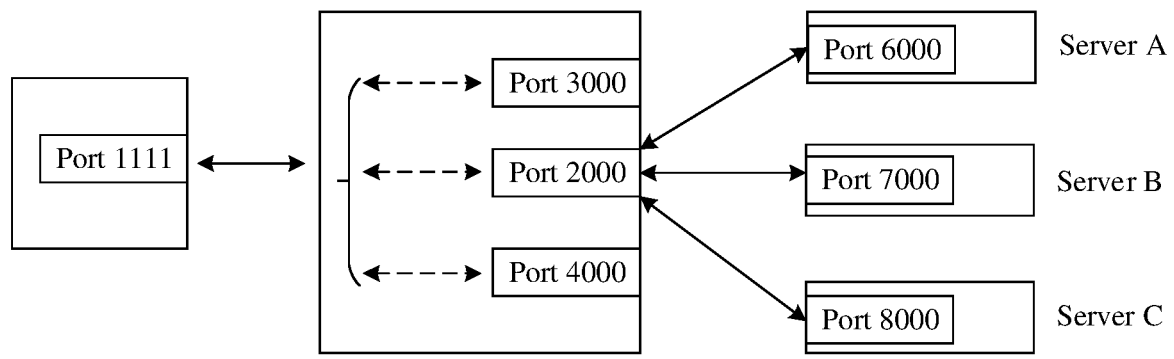

NAT types may be specifically classified into cone NAT (as shown in FIG. 2a) and symmetric NAT (as shown in FIG. 2b). Therefore, mapping between an internal network address and an external network address may be one-to-one mapping, or may be one-to-many mapping. For example, when the NAT type of a NAT device is cone NAT, the cone NAT device fixedly translates one internal network address into one external network address. In this case, the one-to-one mapping is performed. When the NAT type of a NAT device is symmetric NAT, the symmetric NAT device may translate one internal network address into a plurality of external network addresses. In this case, the one-to-many mapping is performed.

An example in which the terminal 1 (where the internal network address is 192.168.0.100:10000) sends a data packet to a server 1 (where the destination address is 210.15.27.166:8000) is used to describe the working process of the NAT device. The process of the NAT device is as follows. The internal network address of the terminal may also be referred to as a source address of the terminal.

(1) When the terminal 1 needs to send the data packet to the server 1 through the NAT device, the NAT device needs to obtain, from the mapping table, a record about the source address 192.168.0.100:10000. It should be understood that, if the terminal 1 sends the data packet to the server 1 for the first time, the record about the source address 192.168.0.100:10000 is not yet created in the mapping table of the NAT device. In this case, the record about the source address 192.168.0.100:10000 needs to be created in the mapping table, and an external network port or an external network address needs to be allocated. For example, the NAT device allocates an external network address or an external network port 210.21.12.140:2000 to the terminal 1.

It should be understood that the NAT device may allocate an external network address and/or an external network port to the terminal. For ease of description, in the present disclosure, the external network address and the external network port allocated by the NAT device to the terminal are collectively referred to as the external network address allocated by the NAT device to the terminal.

(2) The NAT device modifies a source address of the data packet, and then sends the data packet to an external network. Modifying the source address of the data packet by the NAT device is modifying the source address corresponding to the data packet to an external network address, that is, modifying 192.168.0.100:10000 to 210.21.12.140:2000. Then, all data packets with the source address 192.168.0.100:10000 and the destination address 210.15.27.166:8000 are modified as described above.

Because the terminal sends the data packet to the external network, the external network may then send a data packet to the internal network terminal through the NAT device. A process is as follows:

(3) The NAT device receives a data packet sent by the server 1 to the external network address (210.21.12.140: 2000) through the destination address (210.15.27.166:8000), and the NAT device may obtain, by querying the mapping table, the internal network address 192.168.0.100:10000 that has a mapping relationship with the external network address 210.21.12.140:2000.

(4) The NAT device modifies the destination address of the data packet, and then sends the data packet to the terminal 1 in an internal network. Modifying the destination address of the data packet by the NAT device is modifying the external network address (210.21.12.140:2000) to the internal network address (210.15.27.166:8000) mapped to the external network address.

It can be learned from the working process of the NAT device that the NAT device implements address mapping by modifying the source address and the destination address of the data packet. A working principle of the NAT device may be summarized as follows: The external network may send data to the internal network terminal only when the internal network terminal actively sends data to the external network. A source address of data sent from the internal network to the external network is modified, and a destination address of a data packet sent from the external network to the internal network is modified.

It should be understood that either of two terminals behind different NAT devices, such as a first terminal and a second terminal, may directly send a user datagram protocol (UDP) packet to an external network address of the other terminal for communication if the terminal knows the external network address mapped by a NAT device of the other terminal. In other words, NAT traversal is implemented. However, the terminal cannot directly obtain a NAT external network address of the terminal. Generally, a network device (for example, a server) needs to be introduced to help the terminal obtain the external network address of the terminal. The following uses a cone NAT-cone NAT combination as an example to describe a NAT traversal process.

Figure 3:
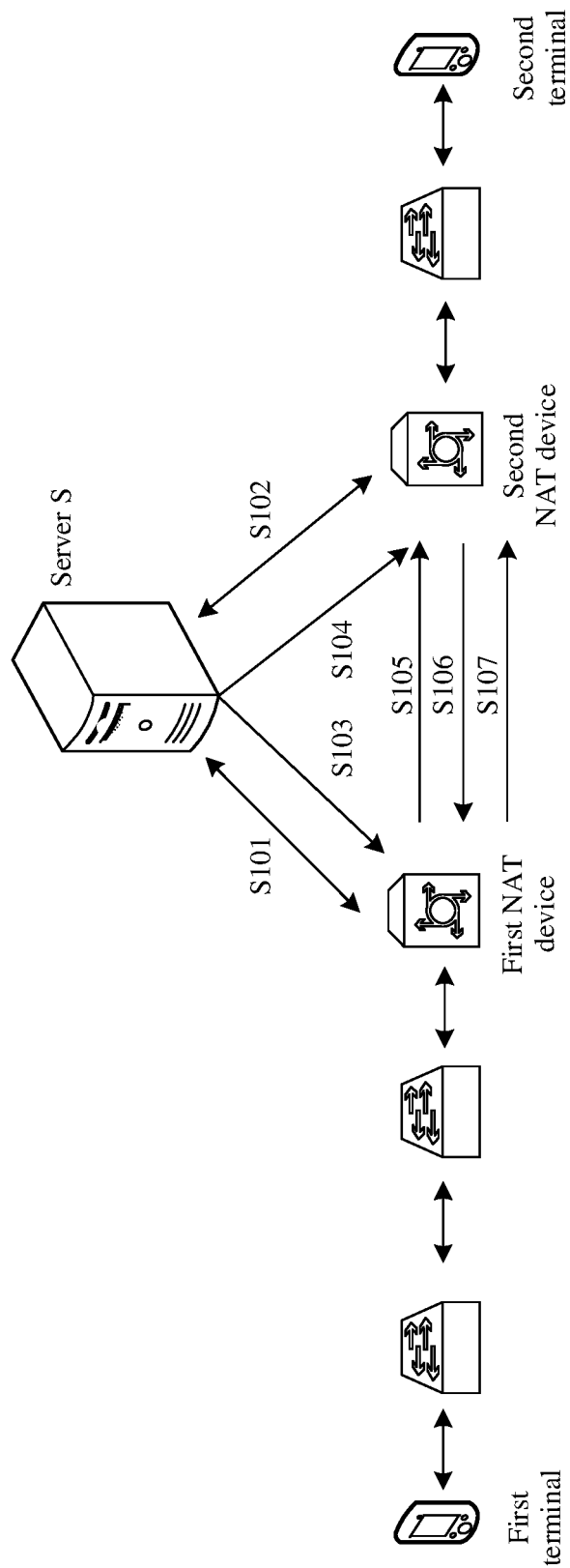
FIG. 3 is a schematic diagram of an example NAT traversal process based on a cone-cone combination.

FIG. 3 is a schematic diagram of an example NAT traversal process based on the cone NAT-cone NAT combination. The following steps are included:

S101: A first terminal sends a query message to a network device through a first NAT device, to query an external network address of the first terminal, and the network device returns the external network address of the first terminal to the first terminal.

The external network address of the first terminal may be configured by the first NAT device. A specific process may be as follows: After the first terminal sends the query message to the network device through the first NAT device, the first NAT device configures, for the first terminal based on the query message, the external network address corresponding to the first terminal, and then the network device sends the external network address information to the first terminal.

S102: A second terminal sends a data packet to the network device through a second NAT device, to query an external network address of the second terminal, and the network device returns the external network address of the second terminal to the second terminal.

S103: The network device sends the external network address of the first terminal to the second terminal.

It should be understood that the network device sends the external network address of the first terminal to the second terminal through the first NAT device.

S104: The network device sends the external network address of the second terminal to the first terminal.

It should be understood that the network device sends the external network address of the second terminal to the first terminal through the second NAT device.

S105: The first terminal sends a hole punching message to the external network address of the second terminal, where the hole punching message is used to generate a mapping table of a second external network address by the first NAT device.

S106: The second NAT device sends a passthrough request message to the first terminal, to attempt to establish a P2P channel.

It should be understood that, when the second NAT device sends the passthrough request message for the first terminal, the second NAT device generates a mapping table of a first external network address. The first NAT device already generates the mapping table of the second external network address in advance in step S105. Therefore, in this step, the passthrough request message sent through the second external network address may reach the first terminal.

S107: After receiving the passthrough request message sent through the second external network address, the first terminal sends a passthrough response message to the second external network address. In step S106, the mapping table of the first external network address is generated when the second terminal sends the passthrough request message to the first external network address through the second external network address. Therefore, the mapping table of the first external network address may be found on the second NAT device. The passthrough response message can reach the second terminal, so that NAT traversal is implemented, and the P2P channel is successfully established.

It should be understood that a working principle of the NAT device is as follows: An external packet may reach an internal network terminal through the NAT device only when a packet is first sent from inside the NAT device. Therefore, if the internal packet is not sent first, when receiving the external packet, the NAT device discards the external packet because the NAT device cannot find a mapping table. For ease of understanding, the external packet in this case is referred to an "unsolicited" packet. As technologies develop, currently, many NAT devices have a time sequence requirement. To be specific, after discarding the "unsolicited" packet, the NAT device blacklists a source IP address and a port that are used to send the "unsolicited" packet (where the source IP address and the port may be automatically deleted after a period of time). Once the source IP address is blacklisted, a packet sent from the source IP address cannot enter the NAT device. Therefore, when the NAT device has the time sequence requirement, NAT traversal cannot be implemented.

The following describes a process in which the NAT traversal fails due to the time sequence requirement of the NAT device with reference to the accompanying drawings.

Figure 4:
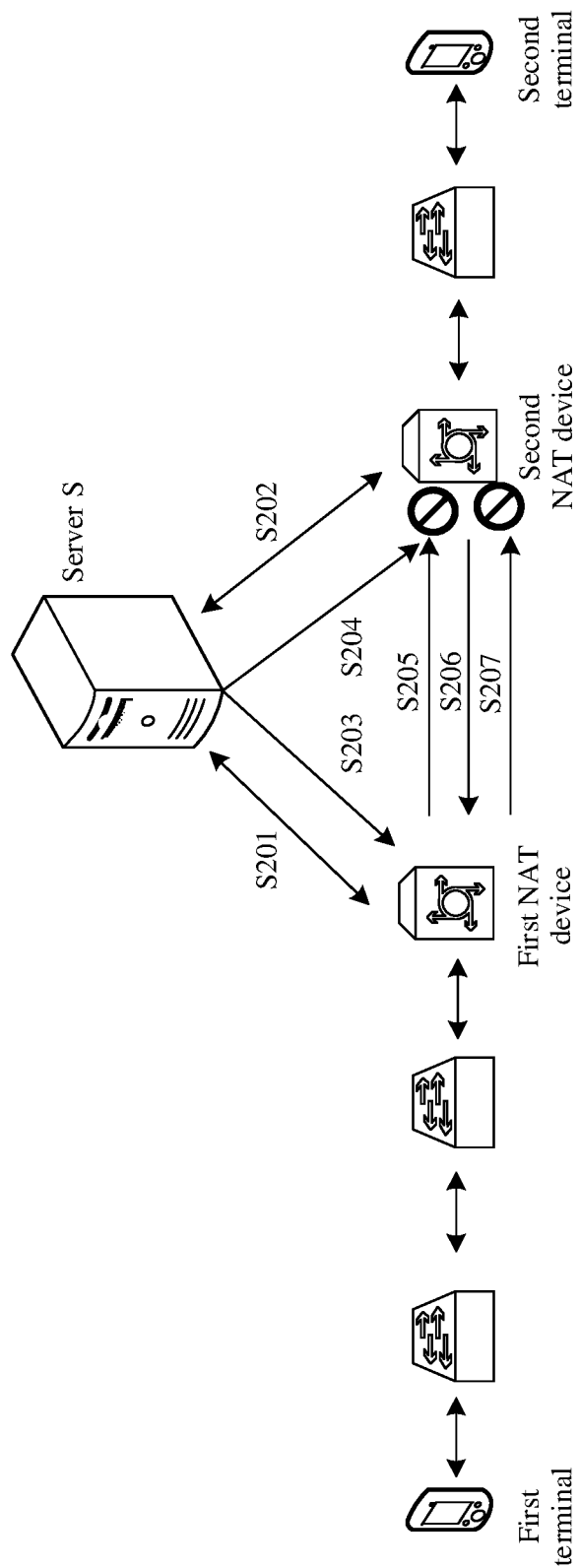
FIG. 4 is a schematic diagram of an example NAT traversal process.

FIG. 4 is a schematic diagram of an example NAT traversal process. The following steps are included:

S201: A first terminal sends a query message to a network device, to query an external network address of the first terminal, and the network device returns a first external network address of the first terminal to the first terminal.

S202: A second terminal sends a query message to the network device, to query an external network address of the second terminal, and the network device returns a second external network address of the second terminal to the second terminal.

S203: The network device sends the first external network address of the first terminal to the second terminal.

S204: The network device sends the second external network address of the second terminal to the first terminal.

S205: The first terminal sends a hole punching message to the second external network address, where when the hole punching message is sent from a first NAT device, the first NAT device generates a mapping table of the second external network address; because a mapping table of the first external network address cannot be found on a second NAT device, the hole punching message is an "unsolicited" packet; and the first external network address is blacklisted.

S206: The second terminal sends a passthrough request message to the first terminal, where when the passthrough request message is sent from the second NAT device, the second NAT device generates the mapping table of the first external network address; and because in step S205, the first NAT device already generates the mapping table of the second external network address in advance, the passthrough request message may reach the first terminal.

S207: After receiving the passthrough request message, the first terminal sends a passthrough response message to the second external network address, where it should be understood that in this case, although the mapping table of the first external network address can be found on the second NAT device, because the first external network address is already blacklisted, the passthrough response message cannot reach the second terminal, and a P2P channel fails to be established.

For the foregoing problem of a NAT traversal failure caused by a time sequence of a NAT device, currently, time to live (TTL) may be set, so that a hole punching message can be sent from a local NAT device but cannot reach a peer NAT device, and the local NAT device can generate a mapping table. In this way, an external packet may be sent in without making the hole punching message "unsolicited", to prevent a local external network address from being blacklisted.

However, in a currently used method, TTL is set to a fixed empirical value, and existing network devices vary greatly. For example, quantities of hops between terminals and NAT devices are different. As shown in FIG. 4, the first terminal needs to reach the local NAT device through three hops, but the second terminal can reach the local NAT device through two hops. Therefore, setting the TTL to a fixed value has a great limitation. As long as TTL of a traversal party does not meet the set empirical value, the traversal fails.

To address the foregoing problem, an embodiment of this application provides a NAT traversal method. TTL is bidirectionally dynamically detected by a local end and a peer end, to adapt to NAT devices with different TTL in an existing network, so as to resolve a problem of low traversal efficiency of a NAT device having a time sequence requirement.

Figure 5:
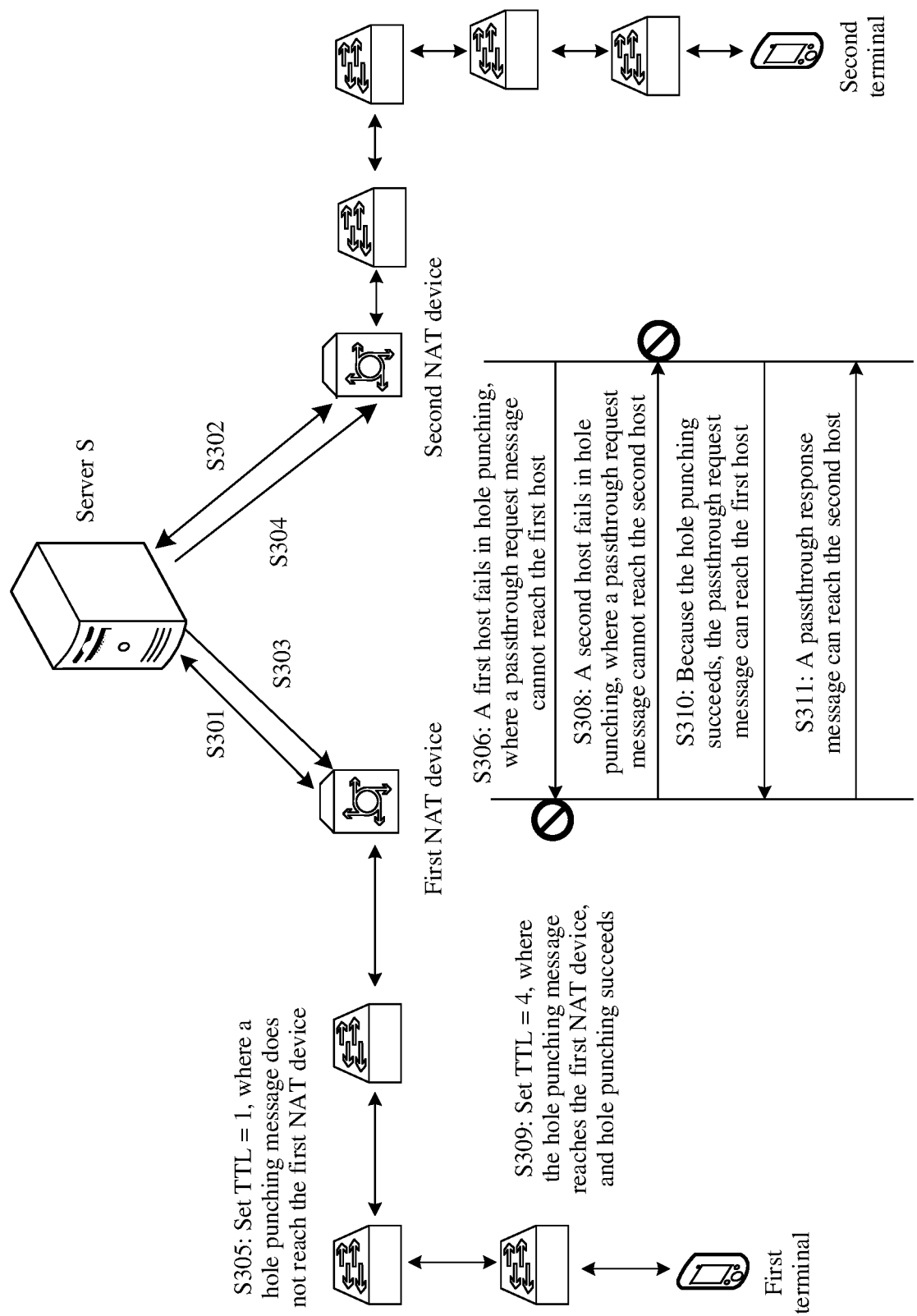
FIG. 5 is a schematic diagram of a NAT traversal process according to an embodiment of this application.

FIG. 5 is a schematic diagram of a NAT traversal process according to an embodiment of this application.

It should be understood that the NAT traversal method provided in this embodiment of this application may be applied to a system that includes at least one terminal and in which different terminals are located in networks constructed by different NAT devices, for example, applied to a system in which a first terminal communicates with a second terminal. The first terminal is a terminal in a network constructed by a first NAT device, the second terminal is a terminal in a network constructed by a second NAT device, and the first NAT device is different from the second NAT device. Both the first NAT device and the second NAT device may be cone NAT devices. The NAT traversal process includes the following steps.

S301: The first terminal sends a first query message to a network device, to query an external network address corresponding to the first terminal, and the network device sends the external network address of the first terminal to the first terminal based on the first query message.

It should be understood that the first terminal is one of at least one terminal in the network constructed by the first NAT device, and the first NAT device may be a cone NAT device.

In an implementation, the first terminal may send the first query message to the network device through the first NAT device. The first NAT device independently configures the corresponding external network address for the first terminal based on the first query message, and then a server S sends the external network address to the first terminal through the first NAT device.

S302: The second terminal sends a second query message to the network device, to query an external network address corresponding to the second terminal, and the network device sends the external network address of the second terminal to the second terminal based on the second query message.

It should be understood that the second terminal is one of at least one terminal in the network constructed by the second NAT device. The second NAT device may be a cone NAT device, and the second NAT device is different from the first NAT device.

In an implementation, the second terminal may send the second query message to the network device through the second NAT device. The second NAT device independently configures the corresponding external network address for the second terminal based on the second query message, and then the server S sends the external network address to the second terminal through the second NAT device.

S303: The network device sends the external network address corresponding to the second terminal to the first terminal.

It should be understood that the network device sends the external network address corresponding to the second terminal to the first terminal through the first NAT device.

S304: The network device sends the external network address corresponding to the first terminal to the second terminal.

It should be understood that the network device sends the external network address corresponding to the first terminal to second terminal through the second NAT device.

S305: The first terminal sets the TTL to first TTL.

In an implementation, a value of the first TTL may be less than a smaller value of a first hop count and a second hop count. The first hop count is a quantity of network segments between the first terminal and the first NAT device, or a quantity of network segments that a message sent by the first terminal needs to pass to reach the first NAT device. The second hop count is a quantity of network segments between the second terminal and the second NAT device, or a quantity of network segments that a message sent by the second terminal needs to pass to reach the second NAT device. The first TTL may be, for example, 1.

S306: The first terminal determines whether the first terminal receives, within the set TTL, a first passthrough message sent by the second terminal, and when the first terminal does not receive the first passthrough message within the set TTL, the first terminal sends a second passthrough message to the second terminal, and determines whether the first terminal receives a first response message sent by the second terminal.

Because the first TTL in step S305 is a value tentatively set by the first terminal, the first terminal needs to determine, based on whether a passthrough message sent by a peer end can be received within the first TTL, whether NAT traversal succeeds. Whether the first terminal can receive the first passthrough message sent by the second terminal depends on whether the first NAT device already generates an address mapping table in advance, that is, whether the first NAT device receives a hole punching message sent by the first terminal.

In an implementation, after setting the first TTL, the first terminal sends a first hole punching message to the first NAT device. If the first hole punching message can reach the first NAT device within the first TTL, the first NAT device may establish a mapping table of a destination address corresponding to the first hole punching message, namely, a mapping table of the external network address corresponding to the second terminal, and the first passthrough message subsequently sent by the second terminal to the first terminal may be successfully transmitted to the first terminal. In this case, the first terminal device may send a second response message to the second terminal device. If the first hole punching message does not reach the first NAT device within the first TTL, the first NAT device does not generate a mapping table of the external network address corresponding to the first terminal. When the first NAT device subsequently receives the first passthrough message sent by the second terminal to the first terminal, the message is not transmitted to the first terminal in an internal network. In other words, the first terminal cannot receive the first passthrough message. In addition, due to a time sequence requirement of a NAT device, the external network address corresponding to the second terminal is blacklisted. In this case, the NAT traversal fails. In other words, if the first NAT device does not generate the mapping table of the destination address when the first terminal sets time to live (TTL) to the first TTL, when receiving a first passthrough request message sent by the second terminal, the first NAT device cannot find, in the mapping table, information about the external network address corresponding to the second terminal. The first passthrough request message is considered as an "unsolicited" message, and the first NAT device blacklists the external network address corresponding to the second terminal.

It should be understood that the TTL is a maximum quantity of network segments (namely, hops) that a data packet is allowed to pass before being discarded by a router. When the value of the TTL is less than a hop count between a terminal and a NAT device, a hole punching message cannot reach the NAT device. The NAT device cannot generate a mapping table of a destination address, and therefore, the NAT traversal fails. In this case, the value of the TTL needs to be reset until the value of the TTL is equal to the smaller value of the first hop count and the second hop count, so that the NAT traversal can succeed. For example, in a network scenario shown in FIG. 5, a quantity of hops that the hole punching message needs to pass from the first terminal to the first NAT device is 4, and TTL of the hole punching message is 1. Therefore, the hole punching message cannot reach the first NAT device within the first TTL, and the first NAT device cannot generate the mapping table of the external network address corresponding to the second terminal. Consequently, hole punching fails.

In an implementation, after the first NAT device blacklists the external network address corresponding to the second terminal, the second terminal can no longer receive the message sent by the first terminal. When the second terminal determines that the second response message sent by the first terminal is not received within a specific period of time, the second terminal may determine that the external network address of the second terminal is blacklisted. In this case, the second terminal may re-request the network device to change the external network address corresponding to the second terminal. The network device may reconfigure an external network address for the second terminal through the second NAT device.

In an implementation, when the first terminal does not receive the first passthrough message within the first TTL, the NAT traversal fails. In this case, the second terminal may detect whether the NAT traversal can be implemented within the first TTL. Specifically, after changing the external network address corresponding to the second terminal, the second terminal sets the TTL to first TTL, and sends a second hole punching message to the second NAT device within the first TTL. Within the first TTL, if the second hole punching message can reach the second NAT device, the second NAT device may generate the mapping table of the destination address. In this case, the second terminal may receive the second passthrough message sent by the first terminal. If the second hole punching message cannot reach the second NAT device, the second NAT device cannot generate the mapping table of the destination address. In this case, the second terminal cannot receive the second passthrough message sent by the first terminal.

It should be understood that the first terminal may periodically send the second passthrough message to the second terminal, and the second terminal may also periodically send the second passthrough message to the first terminal.

For example, in the network scenario shown in FIG. 5, a quantity of hops that the second hole punching message needs to pass from the second terminal to the second NAT device is 5, and the TTL of the hole punching message is 1. Therefore, the hole punching message cannot reach the second NAT device when the TTL is the first TTL, and the second NAT device cannot generate the mapping table of the external network address corresponding to the second terminal. Consequently, the hole punching fails.

In an implementation, if the second terminal receives the second passthrough message sent by the first terminal, the second terminal determines that the NAT traversal succeeds, and the second terminal may send the first response message to the first terminal. In this case, the first terminal may determine, based on whether the first response message is received, whether the second passthrough message is received by the second terminal, that is, whether the NAT traversal succeeds.

S307: If the first terminal receives the first response message sent by the second terminal, the first terminal determines that the NAT traversal succeeds; or if the first terminal does not receive the first response message sent by the second terminal, after changing the external network address corresponding to the first terminal and resetting the TTL, the first terminal repeats the foregoing process until the first terminal receives the first passthrough message or the first response message, and determines that the NAT traversal succeeds.

In an implementation, if the second hole punching message reaches the second NAT device within the first TTL, the second NAT device generates the mapping table of the external network address corresponding to the second terminal. When the second NAT device subsequently receives the second passthrough message sent by the first terminal to the second terminal, the message is transmitted to the second terminal, and the second terminal sends the first response message to the first terminal. In this case, the NAT traversal succeeds.

In an implementation, if the second hole punching message does not reach the second NAT device within the first TTL, the second NAT device does not generate the mapping table of the external network address corresponding to the second terminal. When the second NAT device subsequently receives the second passthrough message sent by the first terminal to the second terminal, the message is not transmitted to the second terminal, and the second terminal does not send the first response message to the first terminal. When the first terminal does not receive the first response message within a specific period of time, it is determined that the external network address corresponding to the first terminal is blacklisted.

In an implementation, after the external network address corresponding to the first terminal is blacklisted, the first terminal may re-request the network device to change the external network address. The network device may reallocate, to the first terminal, an external network address corresponding to the first terminal, that is, change the external network address corresponding to the first terminal.

In an implementation, when the second passthrough message is not received by the second terminal, the first terminal resets the value of the TTL, for example, sets the value to second TTL. The second TTL is different from the first TTL. For example, the second TTL may be greater than the first TTL.

In an implementation, after resetting the value of the TTL, the first terminal repeatedly determines whether the first passthrough message is received. If the first passthrough message is received, the NAT traversal succeeds. If the first passthrough message is not received, the first terminal sends the second passthrough message to the second terminal again. When the second passthrough message is received by the second terminal, the first terminal receives the first response message sent by the second terminal. In this case, the NAT traversal succeeds. When the second passthrough message is not received by the second terminal, and the external network address corresponding to the first terminal is blacklisted by the second NAT device, the first terminal changes the external network address corresponding to the first terminal, resets the TTL, and repeats the foregoing process until the first terminal can receive the first passthrough message or the first response message when the TTL is set to a value, that is, until the NAT traversal succeeds.

It should be understood that operations performed by the second terminal correspond to those of the first terminal, and details are not described herein again.

It should be understood that, when it is determined, by using the foregoing steps, that the first terminal or the second terminal do not receive, within the first TTL, the passthrough message sent by the peer end, the value of the TTL needs to be reset. For example, the value of the TTL may be increased, and the foregoing processes of the two terminals are repeated until the value of the TTL can enable the NAT traversal to succeed.

In an example, the TTL is reset to second TTL, where the second TTL is greater than the first TTL. For example, the second TTL is 4. It is determined whether the hole punching message sent by the first terminal can reach the external network address corresponding to the first terminal within the second TTL (where the external network address is a changed external network address). In the scenario shown in FIG. 5, the hole punching message sent by the first terminal needs to pass four hops to reach the first NAT device. When the second TTL is 4, the hole punching message can exactly reach the first NAT device but cannot reach the second NAT device. Therefore, the hole punching message is successfully sent from the local NAT device, the first NAT device may generate the mapping table of the external network address corresponding to the second terminal, and the hole punching succeeds.

In an implementation, after the hole punching succeeds, if the second terminal sends the first passthrough request message to the first terminal through the external network address, because the first NAT device already generates the mapping table of the external network address corresponding to the second terminal in advance, the first NAT device may find, in the mapping table, mapping information of the external network address corresponding to the second terminal, and the passthrough request message may reach the first terminal. In this process, the second NAT device sends the passthrough request message for the first terminal. Therefore, the second NAT device may generate the mapping table of the external network address corresponding to the first terminal.

According to the NAT traversal method provided in this embodiment, the TTL of sending messages by a local end and a peer end is detected and the TTL values are dynamically adjusted, to determine that a message sent by one end in peer-to-peer communication can exactly reach a NAT device at the end but does not reach a NAT device at the peer end. In this way, one end generates a mapping table and an external network address of the end is not blacklisted, so that the NAT traversal is finally implemented.

It should be understood that the value of the TTL may be tested from a relatively small value that can be obtained for the TTL. For example, if quantities of hops between terminals and corresponding NAT devices at ends are roughly determined, and the value of the TTL should not be greater than a smallest quantity of hops in the quantities of hops at the ends. When the value of the TTL is relatively small, and hole punching messages sent by the terminals at the ends do not reach the corresponding NAT devices, the value of the TTL is appropriately increased, and the foregoing determining process is repeated until a hole punching message sent by a terminal at an end can reach a corresponding NAT device and does not reach a NAT device at a peer end. In this case, the hole punching succeeds. The end at which the hole punching message first reaches the corresponding NAT device but does not reach the NAT device at the peer end may be an end that has a smallest quantity of hops between a terminal and a corresponding NAT device.

With reference to the accompanying drawings, the following describes a scenario to which the NAT traversal method provided in the embodiments of this application may be applied.

Figure 6:
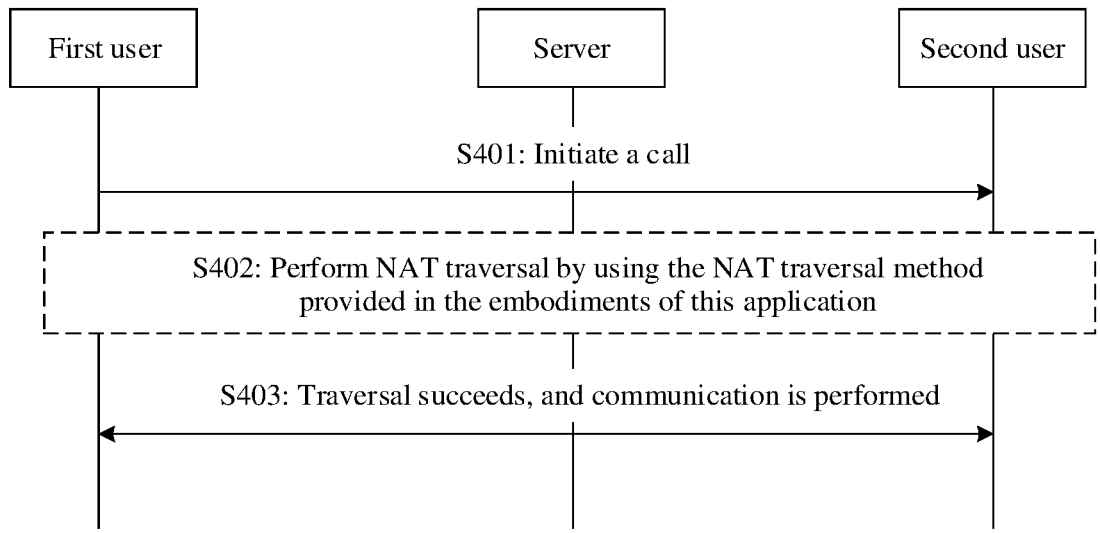
FIG. 6 is a schematic diagram of applying a NAT traversal method to a peer-to-peer communication scenario according to an embodiment of this application.

FIG. 6 is a schematic diagram of applying the NAT traversal method to a peer-to-peer communication scenario according to an embodiment of this application.

It should be understood that the NAT traversal method provided in the embodiments of this application may be applied to the P2P communication scenario, for example, a scenario in which users perform an Internet call (for example, a voice call or a video call). As shown in FIG. 6, when a NAT device in a network in which a first user is located may be a cone NAT device having a time sequence requirement, and a NAT device in a network in which a second user is located may also be a cone NAT device having a time sequence requirement, NAT traversal may be implemented by using a bidirectional TTL detection method provided in the embodiments of this application. The following briefly describes the NAT traversal method provided in the embodiments of this application in this scenario.

S401: The first user initiates a call to the second user through a server.

It should be understood that the call initiated by the first user may be, for example, a voice call or a video call.

S402: After a call request reaches the second user, the first user and the second user may implement the NAT traversal by using the NAT traversal method provided in the embodiments of this application. For a specific process of the NAT traversal method, refer to related descriptions in FIG. 5. To avoid repetition, details are not described herein again.

S403: The first user and the second user perform a P2P network call, where the P2P network call is performed without using the server.

According to the NAT traversal method provided in the embodiments of this application, the NAT traversal is performed by using the bidirectional TTL detection solution, so that the NAT traversal can be successfully completed when a NAT device has the time sequence requirement, so as to implement peer-to-peer communication. In addition, in the NAT traversal method provided in the embodiments of this application, the NAT traversal may be successfully implemented as long as TTL at one of two or more ends at which the NAT traversal is performed ensures that a hole punching message is sent from a NAT device at the end and does not reach a NAT device at another end.

Figure 7:
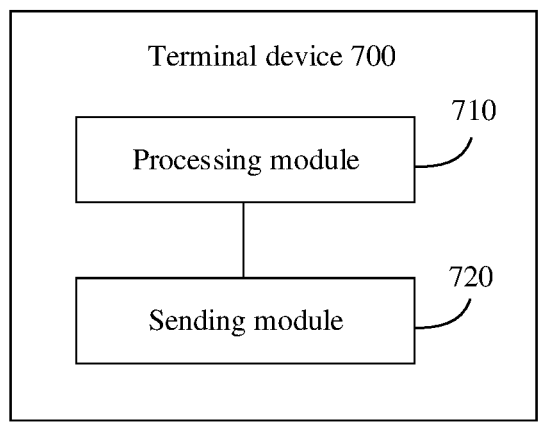
FIG. 7 is a schematic diagram of a structure of a terminal device according to an embodiment of this application.

FIG. 7 is a schematic diagram of a structure of a terminal device according to an embodiment of this application. A terminal device 700 includes a processing module 710 and a sending module 720.

In an implementation, the processing module 710 is configured to: set time to live (TTL) to first TTL, and determine whether a first terminal can receive, within the first TTL, a first passthrough message sent by a second terminal.

In an implementation, the sending module 720 is configured to: when the first terminal does not receive the first passthrough message, send a second passthrough message to the second terminal.

In an implementation, the processing module 710 is further configured to: if the second passthrough message is not received by the second terminal, reset the value of the TTL until the first terminal receives the first passthrough message or the second terminal receives the second passthrough message, and determine that NAT traversal succeeds.

In an implementation, that the processing module 710 resets the value of the TTL and repeats the foregoing process includes: The processing module 710 resets the value of the TTL to second TTL, where the second TTL is greater than the first TTL. The processing module 710 determines whether the first passthrough message can be received within the second TTL. When the first terminal does not receive the first passthrough message, the sending module 720 sends the second passthrough message to the second terminal through a changed external network address. When the second passthrough message is not received by the second terminal, the processing module 710 resets the value of the TTL again.

In an implementation, the first TTL is not greater than a smaller value of a first hop count and a second hop count. The first hop count is a quantity of network segments between the first terminal and a first NAT device, and the second hop count is a quantity of network segments between the second terminal and a second NAT device.

It should be understood that the first NAT device and the second NAT device in this embodiment may be cone NAT devices.

In an implementation, the sending module 720 is further configured to send first query information to a network device through the first NAT device. The first query information is used to query an external network address corresponding to the first terminal. The terminal further includes a receiving module, and the receiving module is configured to receive first response information sent by the network device. The first response information includes the external network address corresponding to the first terminal.

Figure 8:
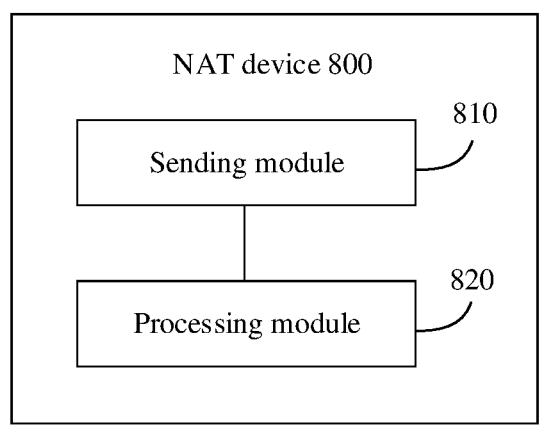
FIG. 8 is a schematic diagram of a structure of a NAT device according to an embodiment of this application.

FIG. 8 is a schematic diagram of a structure of a NAT device 800 according to an embodiment of this application. The NAT device 800 is used in a system in which a first terminal communicates with a second terminal. The first terminal is a terminal in a network constructed by a first NAT device, the second terminal is a terminal in a network constructed by a second NAT device, and the first NAT device is different from the second NAT device. The structure of the NAT device shown in FIG. 8 may be a structural of the first NAT device or a structural of the second NAT device in the embodiments of this application. The NAT device 800 includes a sending module 810 and a processing module 820.

In an implementation, the sending module 810 is configured to send a first passthrough message to the first terminal when TTL is first TTL.

In an implementation, the processing module 820 is configured to: if the first passthrough message cannot be received by the first terminal, determine whether a hole punching message sent by the second terminal is received.

In an implementation, the processing module 820 is further configured to: when the second NAT device does not receive the hole punching message, if the second NAT device receives a second passthrough message sent by the first terminal, blacklist an external network address corresponding to the first terminal, and after resetting the value of the TTL, repeats the foregoing process until the first passthrough message is received by the first terminal or the first NAT device receives the hole punching message.

In an implementation, the sending module 810 is further configured to send the first passthrough message to the first terminal within second TTL, where the second TTL is greater than the first TTL. If the first passthrough message cannot be received by the first terminal, the processing module 820 is further configured to determine whether the hole punching message sent by the second terminal is received. When the second NAT device does not receive the hole punching message, if the second NAT device receives the second passthrough message sent by the first terminal, the processing module 820 is configured to: blacklist a changed external network address corresponding to the first terminal, and after resetting the value of the TTL again, repeat the foregoing process.

In an implementation, the first TTL is not greater than a smaller value of a first hop count and a second hop count. The first hop count is a quantity of hops between the first terminal and the first NAT device, and the second hop count is a quantity of hops between the second terminal and the second NAT device.

It should be understood that the first NAT device and the second NAT device in this embodiment of this application may be cone NAT devices.

In addition, an embodiment of this application further provides a communications system. The communications system includes at least one terminal device, at least one NAT device, and a server. The terminal device and the NAT device are configured to perform the method provided in the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define protection scope.

What is claimed is:

1. A network address translation (NAT) traversal method, performed by a system in which a first terminal communicates with a second terminal, wherein the first terminal is in a network constructed by a first NAT device, the second terminal is in a network constructed by a second NAT device, the first NAT device is different from the second NAT device, and the method comprises:

step 1: setting, by the first terminal, time to live (TTL) to first TTL;

step 2: determining, by the first terminal, that the first terminal does not receive, within the set TTL, a first passthrough message sent by the second terminal, and sending a second passthrough message to the second terminal; and step 3: upon determining that the first terminal receives a first response message sent by the second terminal, determining, by the first terminal, that NAT traversal succeeds, or upon determining that the first terminal does not receive a first response message sent by the second terminal, changing, by the first terminal, an external network address corresponding to the first terminal, resetting the TTL, repeatedly performing step 2 until the first terminal receives the first passthrough message or the first response message, and determining that NAT traversal succeeds.

2. The method according to claim 1, wherein the performing of step 2 after resetting the TTL comprises:

setting, by the first terminal, the TTL as second TTL, and determining whether the first terminal receives, within the second TTL, the first passthrough message resent by the second terminal, wherein the second TTL is greater than the first TTL; and upon receiving the first passthrough message within the second TTL, determining, by the first terminal, that the NAT traversal succeeds, or upon determining that the first terminal does not receive the first passthrough message within the second TTL, sending, by the first terminal, the second passthrough message to the second terminal, wherein upon determining that the first terminal does not receive the first response message sent by the second terminal, the first terminal changes the external network address corresponding to the first terminal again, and resetting the TTL, or upon determining that the first terminal receives the first response message sent by the second terminal, the first terminal determines that the NAT traversal succeeds.

3. The method according to claim 1, further comprising:

upon determining that the first terminal receives the second passthrough message sent by the second terminal, sending, by the first terminal, a second response message to the second terminal.

4. The method according to claim 1, wherein the first TTL is not greater than a smaller value of a first hop count and a second hop count, the first hop count is a quantity of network segments between the first terminal and the first NAT device, and the second hop count is a quantity of network segments between the second terminal and the second NAT device.

5. The method according to claim 1, wherein the first NAT device and the second NAT device are cone NAT devices.

6. The method according to claim 1, further comprising:

sending, by the first terminal, first query information to a network device through the first NAT device, wherein the first query information is used to query the external network address corresponding to the first terminal; and receiving, by the first terminal, first response information sent by the network device, wherein the first response information comprises the external network address corresponding to the first terminal.

7. A network address translation (NAT) traversal method, performed by a system in which a first terminal communicates with a second terminal, wherein the first terminal is in a network constructed by a first NAT device, the second terminal is in a network constructed by a second NAT device, the first NAT device is different from the second NAT device, and the method comprises:

step 1: sending, by the second terminal, a first passthrough message to the first terminal;

step 2: determining, by the second terminal, that the second terminal does not receive a second response message sent by the first terminal, changing an external network address corresponding to the second terminal, and setting time to live (TTL) to first TTL; and step 3: determining, by the second terminal, that the second terminal does not receive, within the set TTL, a second passthrough message sent by the first terminal; and upon determining that the second terminal receives the second passthrough message, determining, by the second terminal, that NAT traversal succeeds, and sending a first response message to the first terminal, or repeatedly performing, by the second terminal, step 1 and step 2 when the second terminal does not receive the second passthrough message within the set TTL, until the second terminal receives the second passthrough message or the second response message, and determining that NAT traversal succeeds.

8. The method according to claim 7, wherein the performing of step 1 and step 2 when the second terminal does not receive the second passthrough message comprises:

upon determining that the second terminal does not receive the second passthrough message, sending, by the second terminal, the first passthrough message to the first terminal, and determining whether the second terminal receives the first response message sent by the first terminal; and upon determining that the second terminal receives the first response message, determining, by the second terminal, that the NAT traversal succeeds, or upon determining that the second terminal does not receive the first response message, changing, by the second terminal, the external network address corresponding to the second terminal again, and setting the TTL as second TTL, wherein the second TTL is greater than the first TTL.

9. The method according to claim 7, wherein the first TTL is not greater than a smaller value of a first hop count and a second hop count, the first hop count is a quantity of network segments between the first terminal and the first NAT device, and the second hop count is a quantity of network segments between the second terminal and the second NAT device.

10. The method according to claim 7, wherein the first NAT device and the second NAT device are cone NAT devices.

11. The method according to claim 7, wherein the changing, by the second terminal, an external network address corresponding to the second terminal comprises:

sending, by the second terminal, second query information to a network device through the second NAT device, wherein the second query information is used to query an external network address corresponding to the first terminal; and receiving, by the second terminal, second response information sent by the network device, wherein the second response information comprises the external network address corresponding to the second terminal.

12. A terminal device, comprising:

at least one processor, configured to: set time to live (TTL) to first TTL, and determine whether a first terminal can receive, within the first TTL, a first passthrough message sent by a second terminal; and a transmitter, configured to: upon determining that the first terminal does not receive the first passthrough message within the set TTL, send a second passthrough message to the second terminal, wherein the at least one processor is further configured to:

determine whether a first response message sent by the second terminal is not received; and after changing an external network address corresponding to the first terminal and resetting the TTL, repeat the process of determining whether the first response message sent by the second terminal is not received within the reset TTL until the first terminal receives the first passthrough message or the first response message, and determine that network address translation (NAT) traversal succeeds.

13. The terminal device according to claim 12, wherein the process of determining whether the first response message sent by the second terminal is not received within the reset TTL after resetting the TTL comprises:

setting, by the at least one processor, the TTL as second TTL, wherein the second TTL is greater than the first TTL, determining, by the at least one processor within the second TTL, whether the first passthrough message can be received, upon determining that the first terminal does not receive the first passthrough message, sending, by the transmitter, the second passthrough message to the second terminal, and determining, by the at least one processor, whether the first response message sent by the second terminal is received; and upon determining that the first terminal receives the first response message sent by the second terminal, the at least one processor is further configured to determine that the NAT traversal succeeds, or upon determining that the first terminal does not receive the first response message sent by the second terminal, the at least one processor is further configured to: change the external network address corresponding to the first terminal, and reset the TTL.

14. The terminal device according to claim 12, wherein the first TTL is not greater than a smaller value of a first hop count and a second hop count, the first hop count is a quantity of network segments between the first terminal and a first NAT device, and the second hop count is a quantity of network segments between the second terminal and a second NAT device.

15. The terminal device according to claim 14, wherein the first NAT device and the second NAT device are cone NAT devices.

16. The terminal device according to claim 14, wherein the transmitter is further configured to:

send first query information to a network device through the first NAT device, wherein the first query information is used to query the external network address corresponding to the first terminal; and receive first response information sent by the network device, wherein the first response information comprises the external network address corresponding to the first terminal.

* * * * *